US010057631B2

United States Patent
Wong et al.

(10) Patent No.: US 10,057,631 B2
(45) Date of Patent: Aug. 21, 2018

(54) INTERFACE FOR BROWSING AND PLAYING CONTENT OVER MULTIPLE DEVICES

(75) Inventors: Ling Jun Wong, Escondido, CA (US); True Xiong, San Diego, CA (US); Charles McCoy, Coronado, CA (US); Leo Pedlow, Ramona, CA (US)

(73) Assignee: Sony Interactive Entertainment America LLC, San Mateo, CA (US)

( * ) Notice: Subject to any disclaimer, the term of this patent is extended or adjusted under 35 U.S.C. 154(b) by 49 days.

(21) Appl. No.: 13/077,509

(22) Filed: Mar. 31, 2011

(65) Prior Publication Data

US 2012/0210352 A1 Aug. 16, 2012

Related U.S. Application Data

(60) Provisional application No. 61/442,157, filed on Feb. 11, 2011.

(51) Int. Cl.
*H04N 21/436* (2011.01)
*H04N 21/422* (2011.01)
*H04N 21/482* (2011.01)
*H04N 21/643* (2011.01)

(52) U.S. Cl.
CPC ... *H04N 21/43615* (2013.01); *H04N 21/4222* (2013.01); *H04N 21/4828* (2013.01); *H04N 21/64322* (2013.01)

(58) Field of Classification Search
USPC ..................................................... 725/80, 78
See application file for complete search history.

(56) References Cited

U.S. PATENT DOCUMENTS

| | | | |
|---|---|---|---|
| 6,025,837 A * | 2/2000 | Matthews, III .... | H04N 5/44543 348/E5.105 |
| 6,496,205 B1 | 12/2002 | White et al. | |
| 2002/0010932 A1* | 1/2002 | Nguyen ............. | H04N 5/44543 725/51 |
| 2003/0229900 A1* | 12/2003 | Reisman ........... | G06F 17/30873 725/87 |
| 2007/0112939 A1* | 5/2007 | Wilson et al. ................. 709/219 | |
| 2008/0022322 A1 | 1/2008 | Grannan et al. | |
| 2009/0248888 A1 | 10/2009 | Stifter | |
| 2010/0157168 A1 | 6/2010 | Dunton et al. | |
| 2012/0162537 A1* | 6/2012 | Maddali et al. .............. 348/734 | |

OTHER PUBLICATIONS

"AT&T's U-verse app now on more Android devices, including the LG Thrive, LG Phoenix and Samsung Infuse," Mobile Nations, http://www.androidcentral.com/atts-u-verse-app-now-more-android-devices-including-Ig-thrive-Ig-phoenix-and-samsung-infuse, Jul. 18, 2011 (5 pages).

* cited by examiner

*Primary Examiner* — Fernando Alcon
(74) *Attorney, Agent, or Firm* — Procopio, Cory, Hargreaves & Savitch LLP

(57) ABSTRACT

Browsing and displaying content over multiple devices, including: displaying a graphical user interface program on a second device; associating the second device with a main device; receiving transactions performed by a user on the second device with the graphical user interface; sending at least one command to the main device after the transactions performed by the user on the second device with the graphical user interface are received by the second device; and executing the at least one command on the main device. Keywords include visual BIVL interface and IPTV client without GUI.

14 Claims, 3 Drawing Sheets

INTERFACE FOR BROWSING AND PLAYING CONTENT OVER MULTIPLE DEVICES

CROSS-REFERENCE TO RELATED APPLICATIONS

This application claims the benefit of priority of U.S. Provisional Patent Application No. 61/442,157, filed Feb. 11, 2011, entitled "Visual BIVL Interface for Devices without a Visual User Interface." The disclosure of the above-referenced patent application is incorporated herein by reference.

BACKGROUND

Field of the Invention

The present application relates to internet video services, and more specifically, to browsing and playing media content over multiple devices.

Background

Internet video services playing media such as Bravia Internet Video Link (BIVL) enable users to browse and search content on the Internet. The browsing and searching can be done using Internet Protocol television (IPTV) which uses the architecture and networking methods of the Internet Protocol Suite over a packet-switched network infrastructure.

Also, a user may use Graphical User Interface (GUI) to browse, search or view content on IPTV. However, many times media content via BIVL or IPTV must be browsed, searched, or played on a single device, making the viewing experience for the user disruptive or inconvenient. Also, some devices that lack GUI capabilities (e.g. a home audio device that only displays text) may not be able to browse BIVL services with IPTV simply because they lack the ability to display a GUI or graphics to a user.

SUMMARY

Implementations of the present application provide for a user interface that can be used over multiple devices.

In one implementation, provided is a method for browsing and displaying content over multiple devices, including: displaying a graphical user interface program on a second device; associating the second device with a main device; receiving transactions performed by a user on the second device with the graphical user interface; sending at least one command to the main device after the transactions performed by the user on the second device with the graphical user interface are received by the second device; and executing the at least one command on the main device.

In another implementation, provided is a non-transitory storage medium storing a computer program for browsing and playing content over multiple devices, the computer program comprising executable instructions that cause a computer to perform a method comprising: displaying a graphical user interface program on a second device; associating the second device with a main device; receiving transactions performed by a user on the second device with the graphical user interface; sending at least one command to the main device after the transactions performed by the user on the second device with the graphical user interface are received by the second device; and executing the at least one command on the main device.

In yet another implementation, provided is a system to allow seamless browsing and playing of content over multiple devices, including: a main device used for playing content; at least one second device used for browsing content; and an internet protocol television server associated with the main device and the at least one second device.

Other features and advantages of the present application will become more readily apparent to those of ordinary skill in the art after reviewing the following detailed description and accompanying drawings.

DETAILED DESCRIPTION

Figure 1:
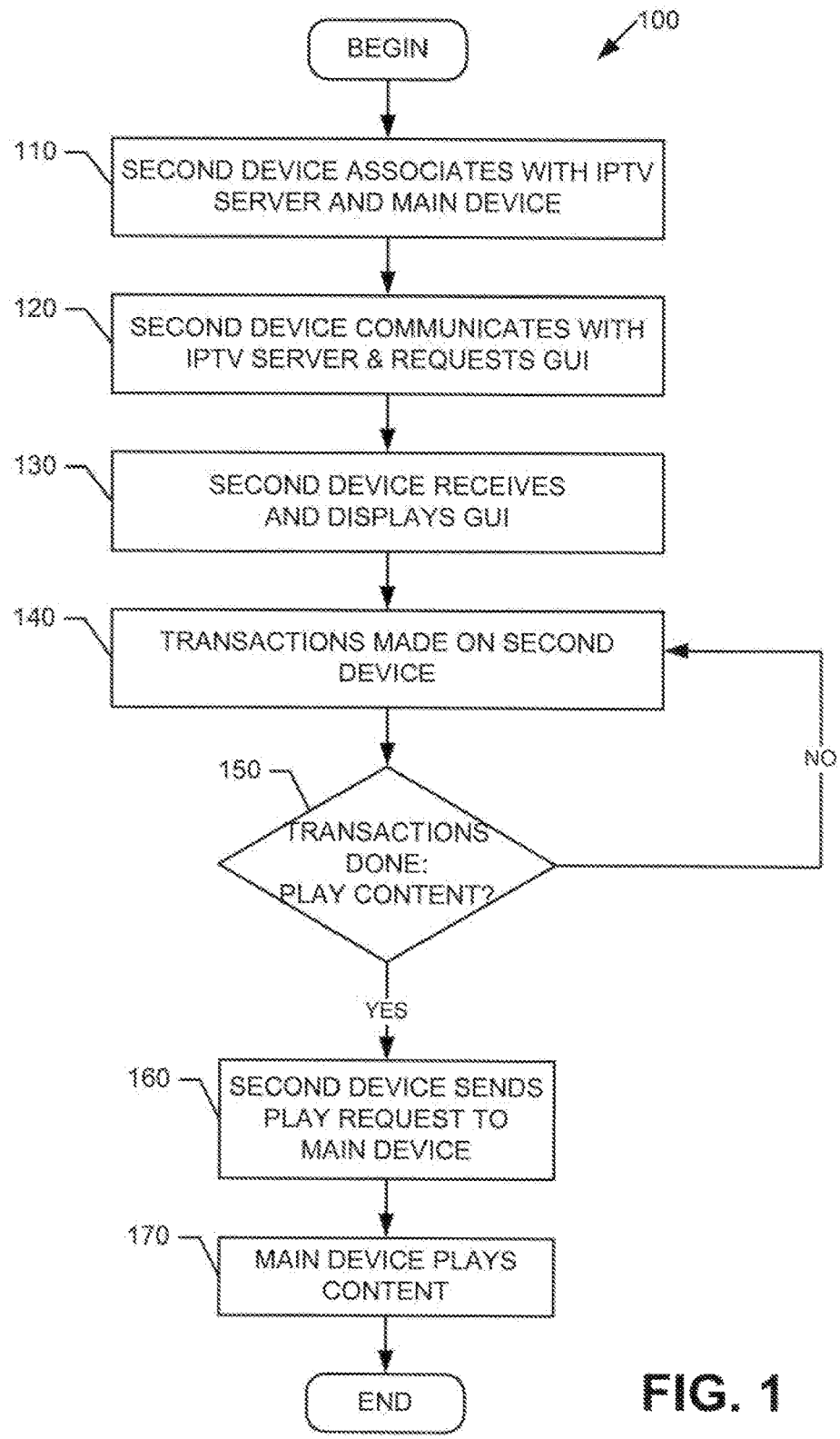
FIG. 1 is a flowchart illustrating a process for browsing content on at least one second device and displaying the content on a main device without interrupting the display of main device in accordance with one implementation of the present application.

Certain implementations as disclosed herein provide for a user interface for multiple devices. After reading this description it will become apparent how to implement the present application in various alternative implementations and alternative applications. However, although various implementations of the present invention will be described herein, it is understood that these implementations are presented by way of example only, and not limitation. As such, this detailed description of various alternative implementations should not be construed to limit the scope or breadth of the present application.

Apparatuses, systems and methods are provided that enable a user that is browsing media content on at least one device (e.g., a second device) to have the selection played by another device (e.g., a main device such as an IPTV client). The user can then continue to browse the media content on any number of additional devices without interrupting the content that is being played on the main device.

In some implementations, an IPTV client is configured without a graphical user interface (GUI). For example, an IPTV client configured as a home audio device may only have a textual user interface with no keyboard input or graphics. In this case, where an IPTV client is configured without a GUI, the IPTV server can reconfigure the system so that another device with a GUI (e.g., a laptop computer) can browse and search the BIVL content. In one implementation, an interface may be integrated into the device lacking the GUI so that the user can make selections purely by text, for example. In another implementation, an interface may be integrated into the device lacking the GUI so that the user can make selections purely by voice or over any phone-type of device, for example.

Provided is a way to navigate around (e.g., browsing, playing and searching BIVL content) a main display without disturbing the viewing experience of other users who are watching the main display. By only using one device to view, browse and search BIVL content, issues of cumbersome data entry, limitations in memory and processing power, and difficulties in effective content searches arise. However, by providing a second device as a visual aid to the IPTV client, the user's viewing experience can be enhanced.

The cost for this enhanced viewing experience can also be reduced by using devices such as cellphones, laptops, and other portable devices, which are already owned by most users, as a second device. By requiring that a content/service provider send the content for playback on the IPTV client only when the user is ready to watch it, security risks are substantially reduced because the playback of proprietary content does not occur on a non-authenticated second device. Further, since the web application of the second device is usually written in HTML, it can be loaded by any device with a browser.

An IPTV client may also be configured without a GUI, such as a home audio device that only displays text. This makes it difficult for the IPTV client to conform or utilize many features of the Internet content services such as BIVL. In one implementation, the IPTV server can reconfigure the system so that a second device having a GUI (e.g., a laptop computer) is used to browse and search Internet content and utilize the features of the internet content service.

In one implementation, a method of reconfiguring the system so that the second device with a GUI (e.g., a laptop computer) is used to browse and search Internet content and utilize the features of the Internet content service is provided. The method connects the second device having a GUI display to the IPTV client and uses its unique identifier. The second device communicates with the IPTV server on behalf of the IPTV client and requests for the graphical version of the service. The second device then displays the user interface of the Internet content service that was requested. The user navigates and makes transactions on the second device. Transactions can include purchases of assets, data entry and even the registration procedures of the IPTV client. The IPTV client (e.g., a home audio device) only needs to respond to the playback requests sent by the second device.

FIG. 1 is a flowchart illustrating a process 100 for browsing content on at least one second device and displaying the content on a main device without interrupting the display of main device in accordance with one implementation of the present application. The main device, in one implementation, is an IPTV client. In one implementation, the main device may not have a GUI and may be, for example, a home audio device with only text-based input. In another implementation, the main device may not have a GUI and may be, for example, a device that only takes audio-based or speech input. In one implementation, the code or instructions to run the GUI may be already on the second device and need not be requested from a server.

In box 110, the second device associates with the IPTV server and the main device. In one implementation, the second device may connect directly with the main device, for example, by using a unique identifier or other form of ID. In one implementation, addressing communication directly from the second device to the main device may still include the scenario of the direct communication going through a number of other network devices, e.g., wireless routers, or other wireless devices—this would still cover the scenario of communicating directly. In one implementation, the unique identifier may be known by the software and may be used to communicate the user's choice. In one implementation, the second device may also connect with a proxy server instead of the main device, and the main device may connect with the proxy server later. In one implementation, the second device may connect with an IPTV server, for example, and the main device may also connect with an IPTV server so that both the second device and the main device are connected via the IPTV server. In such a case, the main device may initiate contact with the IPTV server, which is addressable on the internet, since the main device may be likely part of a local network and also not addressable from the internet. Lightweight protocols, such as XMPP, can be used to have the main device listen for commands from the IPTV server. In one implementation, the second device does not connect with the main device until it sends a play request to the main device.

If the second device wants to browse internet content, some form of authentication may be established so that the second device has the credentials to browse on behalf of the main device. Picking from a list of BIVL devices from a server is consistent with this purpose, because both the second device and the main device may not be in the same network. However, if the main device does not support BIVL, there may not be a need to obtain the same credentials because the native settings are used, and discovering the device via a discovery protocol may establish a sufficient communication channel between the two devices, which may be in the same network to facilitate communications. In one implementation, the second device gets all of the device information it needs from a proxy server or IPTV server so that the second device only needs to communicate to the main device to request it to play selected content. In one implementation, the second device may communicate directly to the main device, such as when the second device performs device discovery. In one implementation, the main device to control can be done via device discovery or device registration. In one implementation, device discovery, device registration or a device list may not be required or pulled from a server.

In box 120, the second device communicates with the IPTV server and requests a GUI or graphical version of an interface used to browse the Internet media content. In one implementation, box 120 may be optional or dependent on the type of method selected, and also dependent on whether or not the second device can be implemented as a web application—for example, a GUI might already be available on the second device, so no request is made. In one implementation, once the user selects the main device with the second device, the second device communicates with the IPT sever on behalf of the main device and then transactions are made on the second device. In box 130, the second device displays the GUI after receiving it. In one implementation, the second device can be for example a laptop computer, and it would display a GUI that would make it convenient for a user to browse for BIVL content. In box 140, transactions are made on the second device via a user that navigates and uses the GUI on the second device. Transactions can include, for example, purchase of assets, purchases of movie, video game, music, still images, applications, or other content selections for play, data entry, data updates (e.g., user contact and financial information) and even registration procedures associated with the IPTV. Content can include, for example, movies, music, video games, still images, applications, media and/or other content that can be purchased or free that may be downloaded, viewed, or streamed.

If it is determined, at box 150, that the transactions are done and content is ready to be played, then the second device sends at least one play request, or playback request, at box 160, to the main device. The main device plays the content, at box 170. Thus, the main device can be used to play the content even though it lacks a GUI to browse the content through an IPTV. Furthermore, in one implementation, additional devices that support GUIs can be added to the second device so that additional users may browse or select BIVL content via a GUI, and play the content on the main device.

Figure 2:
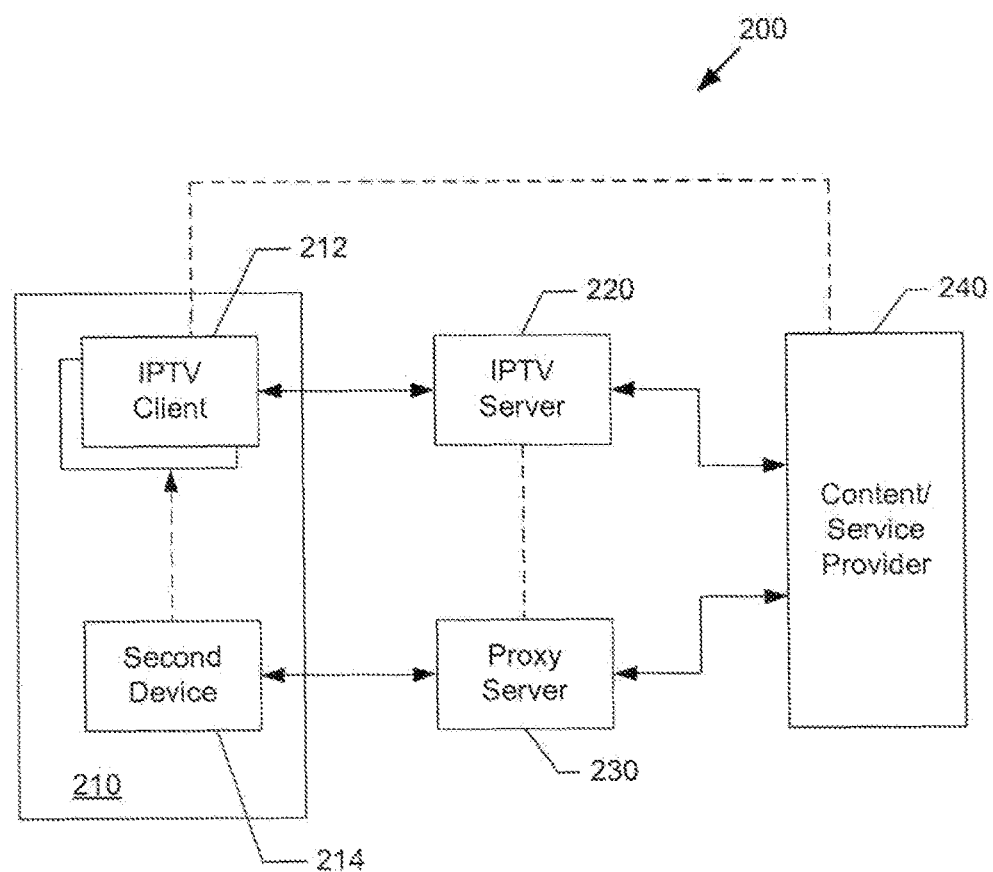
FIG. 2 shows a content transaction system configured to enabling a user browsing media content on one device to have the selection played by another device.

FIG. 2 shows a content transaction system 200 configured to enabling a user browsing media content on one device to have the selection played by another device. In one implementation, the content transaction system 200 includes an IPTV client 212 and a second device 214 configured within a local network 210, which are in communication with an IPTV server 220 and a proxy server 230. The servers 220, 230 are in communication with a content/service provider 240.

The user loads a web application in the second device 214 and logs into an account in the proxy server 230. Once logged into the account, the second device 214 receives a list of compatible IPTV clients 212. Using the second device, the user selects an IPTV client 212. A list of services available to the client 212 is shown on the display of the second device 214. The user can browse and search services and content in the preferred language of the user. For security reasons, BIVL content transaction between the second device 214 and the content/service provider 240 occurs on the proxy server 230 to create a firewall. When content is selected by the user using the second device 214, the content will be sent to the IPTV client 212 for playback. However, the second device 214 may send a reference identifier for the selected content to the IPTV client 212, which retrieves the content using the reference identifier. In one implementation, the IPTV client 212 may send the reference identifier to the proxy server 230.

The authenticated IPTV client 212 sends the reference identifier to the IPTV server 220 which in turn sends it to the content/service provider 240. The IPTV client 212 receives the content selected by the second device 214 from the content/service provider 240 through the IPTV server 220. In one implementation, the IPTV client 212 sends a reference to the IPTV server 220, and the IPTV server 220 responds with information about the reference. The IPTV client 212 receives the content selected by the second device directly from the content/service provider 240 and the IPTV client 212 may contact the content/service provider 240 directly for this information. Thus, the unauthenticated second device 214 is not given access to the content URL to reduce the risk of exposing proprietary information. During playback, the user using the second device 214 continues to browse, search, select, and queue other content for future playback without interrupting the content that is being played on the IPTV client 212. In one implementation, both the selected IPTV client 212 and the second device 214 must be in the same local network 210 in order to perform a playback of the selected content. The user can also switch clients 212 and resume playback on a different client by selecting from a recently viewed list the last media content played and after switching control to that device. In one implementation, the IPTV client 212 may play media directly from the content/service provider 240. Media content can include, for example, BIVL content.

Figure 3A:
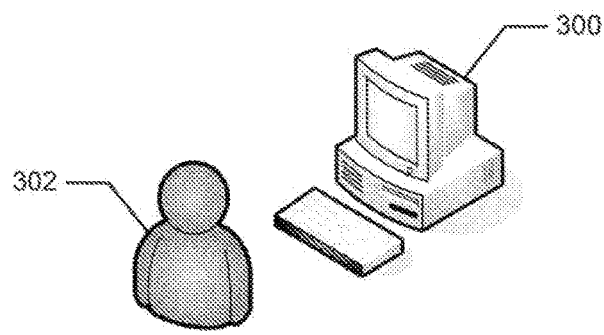
FIG. 3A illustrates a representation of a computer system and a user.

FIG. 3A illustrates a representation of a computer system 300 and a user 302. The user 302 may use the computer system 300 to browse, select and play content across multiple devices. The computer system 300 stores and executes an interface program 390.

Figure 3B:
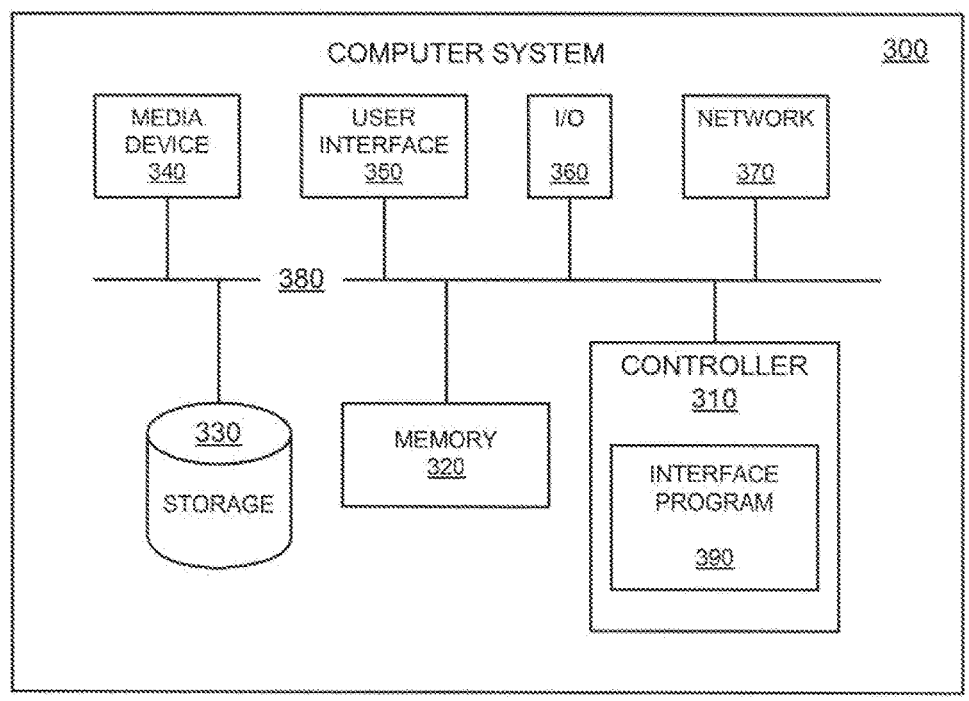
FIG. 3B is a functional block diagram illustrating the computer system hosting a session synchronizer.

FIG. 3B is a functional block diagram illustrating the computer system 300 hosting the interface program 390. The controller 310 is a programmable processor and controls the operation of the computer system 300 and its components. The controller 310 loads instructions (e.g., in the form of a computer program) from the memory 320 or an embedded controller memory (not shown) and executes these instructions to control the system. In its execution, the controller 310 provides the interface program 390 as a software system. Alternatively, this service can be implemented as separate hardware components in the controller 310 or the computer system 300.

Memory 320 stores data temporarily for use by the other components of the computer system 300. In one implementation, memory 320 is implemented as RAM. In one implementation, memory 320 also includes long-term or permanent memory, such as flash memory and/or ROM.

Storage 330 stores data temporarily or long term for use by other components of the computer system 300, such as for storing data used by the interface program 390. In one implementation, storage 330 is a hard disk drive.

The media device 340 receives removable media and reads and/or writes data to the inserted media. In one implementation, for example, the media device 340 is an optical disc drive.

The user interface 350 includes components for accepting user input from the user of the computer system 300 and presenting information to the user. In one implementation, the user interface 350 includes a keyboard, a mouse, audio speakers, and a display. The controller 310 uses input from the user to adjust the operation of the computer system 300.

The I/O interface 360 includes one or more I/O ports to connect to corresponding I/O devices, such as external storage or supplemental devices (e.g., a printer or a PDA). In one implementation, the ports of the I/O interface 360 include ports such as: USB ports, PCMCIA ports, serial ports, and/or parallel ports. In another implementation, the I/O interface 360 includes a wireless interface for communication with external devices wirelessly.

The network interface 370 includes a wired and/or wireless network connection, such as an RJ-45 or "Wi-Fi" interface (including, but not limited to 302.11) supporting an Ethernet connection.

The computer system 300 includes additional hardware and software typical of computer systems (e.g., power, cooling, operating system), though these components are not specifically shown in FIG. 3B for simplicity. In other implementations, different configurations of the computer system can be used (e.g., different bus or storage configurations or a multi-processor configuration).

The above description of the disclosed implementations is provided to enable any person skilled in the art to make or use the present application. Various modifications to these implementations will be readily apparent to those skilled in the art, and the generic principles described herein can be applied to other implementations without departing from the spirit or scope of the invention. Accordingly, additional implementations and variations are also within the scope of the invention. For example, the examples focus on an IPTV client and browsing of the BIVL content, but devices other than an IPTV client can be used as a main display device and the second device can browse and search for content other than the BIVL content. Further, it is to be understood that the description and drawings presented herein are merely representative of the subject matter which is broadly contemplated by the present application. Thus, the present application is not intended to be limited to the implementations shown herein but is to be accorded the widest scope consistent with the principal and novel features disclosed herein.

Various implementations of the present application are realized in electronic hardware, computer software, or combinations of these technologies. Some implementations include one or more computer programs executed by one or more computing devices. In general, the computing device includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., game controllers, mice and keyboards), and one or more output devices (e.g., display devices).

The computer programs include executable code that is usually stored in a persistent storage medium and then copied into memory at run-time. At least one processor executes the code by retrieving program instructions from memory in a prescribed order. When executing the program code, the computer receives data from the input and/or storage devices, performs operations on the data, and then delivers the resulting data to the output and/or storage devices.

Those of skill in the art will appreciate that the various illustrative modules and method steps described herein can be implemented as electronic hardware, software, firmware or combinations of the foregoing. To clearly illustrate this interchangeability of hardware and software, various illustrative modules and method steps have been described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the present application. In addition, the grouping of functions within a module or step is for ease of description. Specific functions can be moved from one module or step to another without departing from the present application.

Additionally, the steps of a method or technique described in connection with the implementations disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An example storage medium can be coupled to the processor such that the processor can read information from, and write information to, the storage medium. In the alternative, the storage medium can be integral to the processor. The processor and the storage medium can also reside in an ASIC. All features of each above-discussed example are not necessarily required in a particular implementation of the present application. Further, it is to be understood that the description and drawings presented herein are representative of the subject matter which is broadly contemplated by the present application. It is further understood that the scope of the present application fully encompasses other implementations that may become obvious to those skilled in the art and that the scope of the present application is accordingly limited by nothing other than the appended claims.

The invention claimed is:

1. A method for browsing services and playing content over multiple devices, comprising:
displaying a graphical user interface on a second device;
loading a web application on the second device;
browsing the services and selecting the content using the graphical user interface and the web application of the second device,
wherein browsing the services and selecting the content comprise navigating and making transactions on the second device including purchasing of assets and making data entry;
associating the second device with a first device configured as a client device,
wherein the first device lacks a graphical user interface but is configured to play the content sent from the content server device to the first device,
wherein the second device is not authenticated to play the content sent from the content server device;
receiving transactions of the content purchased using the graphical user interface of the second device, the content comprising at least one of movies, music, video games, and still images;
sending at least one command to the first device after the transactions performed by a user on the second device with the graphical user interface are received by the main server device,
wherein sending at least one command to the first device comprises:
connecting the second device with a proxy server device;
receiving information on the second device from the main server device through the proxy server device about the first device; and
addressing communication directly from the second device to the first device using the received information;
sending the content from the content server device to the first device; and
executing the at least one command on the first device to play the content on the first device.

2. The method of claim 1, wherein associating the second device with the first device comprises:
connecting the second device with the main server device; and
establishing an unique identifier through an indication of the first device to the second device.

3. The method of claim 1, wherein the graphical user interface is requested from the main server device and downloaded into the second device.

4. The method of claim 1, wherein the second device comprises a laptop, cellphone, a desktop computer, or other portable device that supports a graphical user interface.

5. The method of claim 1, wherein sending at least one command to the first device comprises
addressing communication directly from the second device to the first device.

6. The method of claim 1, wherein receiving transactions of the content purchased using the graphical user interface of the second device further comprises:
receiving data entry transactions, wherein the data entry transactions comprise contact, account or financial transactions about the user; and
receiving registration procedures for the first device from the user.

7. A non-transitory storage medium storing a computer program for browsing services and playing content over multiple devices, the computer program comprising executable instructions that cause a computer to perform a method comprising:
displaying a graphical user interface on a second device;
loading a web application on the second device;
browsing the services and selecting the content using the graphical user interface and the web application of the second device, wherein browsing the services and selecting the content comprise navigating and making transactions on the second device including purchasing of assets and making data entry;

associating the second device with a first device configured as a client device, wherein the first device lacks a graphical user interface but is configured to play the content sent from the content server device to the first device, wherein the second device is not authenticated to play the content sent from the content server device;

receiving transactions of the content purchased using the graphical user interface of the second device, the content comprising at least one of movies, music, video games, and still images;

sending at least one command to the first device after the transactions performed by a user on the second device with the graphical user interface are received by the main server device, wherein sending at least one command to the first device comprises:
- connecting the second device with a proxy server device;
- receiving information on the second device from the main server device through the proxy server device about the first device; and
- addressing communication directly from the second device to the first device using the received information;

sending the content from the content server device to the first device; and executing the at least one command on the first device to play the content on the first device.

8. The non-transitory storage medium of claim 7, wherein associating the second device with the first device comprises:
- connecting the second device with the main server device; and
- establishing an unique identifier through an indication of the first device to the second device.

9. The non-transitory storage medium of claim 7, wherein the graphical user interface is requested from the main server device and downloaded into the second device.

10. The non-transitory storage medium of claim 7, wherein the second device comprises a laptop, cellphone, a desktop computer, or other portable device that supports a graphical user interface.

11. The non-transitory storage medium of claim 7, wherein sending at least one command to the first device comprises
- addressing communication directly from the second device to the first device.

12. The non-transitory storage medium of claim 7, wherein receiving transactions of the content purchased using the graphical user interface of the second device further comprises:
- receiving data entry transactions, wherein the data entry transactions comprise contact, account or financial transactions about the user; and
- receiving registration procedures for the first device from the user.

13. A method for browsing services and playing content over multiple devices, comprising:
- displaying a graphical user interface on a second device;
- loading a web application on the second device;
- browsing the services and selecting the content using the graphical user interface and the web application of the second device, wherein browsing the services and selecting the content comprise navigating and making transactions on the second device including purchasing of assets and making data entry;

associating the second device with a first device configured as a client device, wherein the first device lacks a graphical user interface but is configured to play the content sent from the content server device to the first device, wherein the second device is not authenticated to play the content sent from the content server device;

receiving transactions of the content purchased using the graphical user interface of the second device, the content comprising at least one of movies, music, video games, and still images;

sending at least one command to the first device after the transactions performed by a user on the second device with the graphical user interface are received by the main server device, wherein sending at least one command to the first device comprises:
- connecting the second device with a proxy server;
- verifying that the first device is connected with the main server device; and
- communicating with the first device through the main server device;

sending the content from the content server device to the first device; and executing the at least one command on the first device to play the content on the first device.

14. A non-transitory storage medium storing a computer program for browsing services and playing content over multiple devices, the computer program comprising executable instructions that cause a computer to perform a method comprising:
- displaying a graphical user interface on a second device;
- loading a web application on the second device;
- browsing the services and selecting the content using the graphical user interface and the web application of the second device, wherein browsing the services and selecting the content comprise navigating and making transactions on the second device including purchasing of assets and making data entry;

associating the second device with a first device configured as a client device, wherein the first device lacks a graphical user interface but is configured to play the content sent from the content server device to the first device, wherein the second device is not authenticated to play the content sent from the content server device;

receiving transactions of the content purchased using the graphical user interface of the second device, the content comprising at least one of movies, music, video games, and still images;

sending at least one command to the first device after the transactions performed by a user on the second device with the graphical user interface are received by the main server device, wherein sending at least one command to the first device comprises:
- connecting the second device with a proxy server;
- verifying that the first device is connected with the main server device; and
- communicating with the first device through the main server device;

sending the content from the content server device to the first device; and executing the at least one command on the first device to play the content on the first device.

* * * * *